3,376,708
PIPELINE RISER INSTALLATION
Robert G. Hindman, New Orleans, La., assignor to
Esso Production Research Company
Filed Feb. 7, 1966, Ser. No. 525,595
14 Claims. (Cl. 61—72.3)

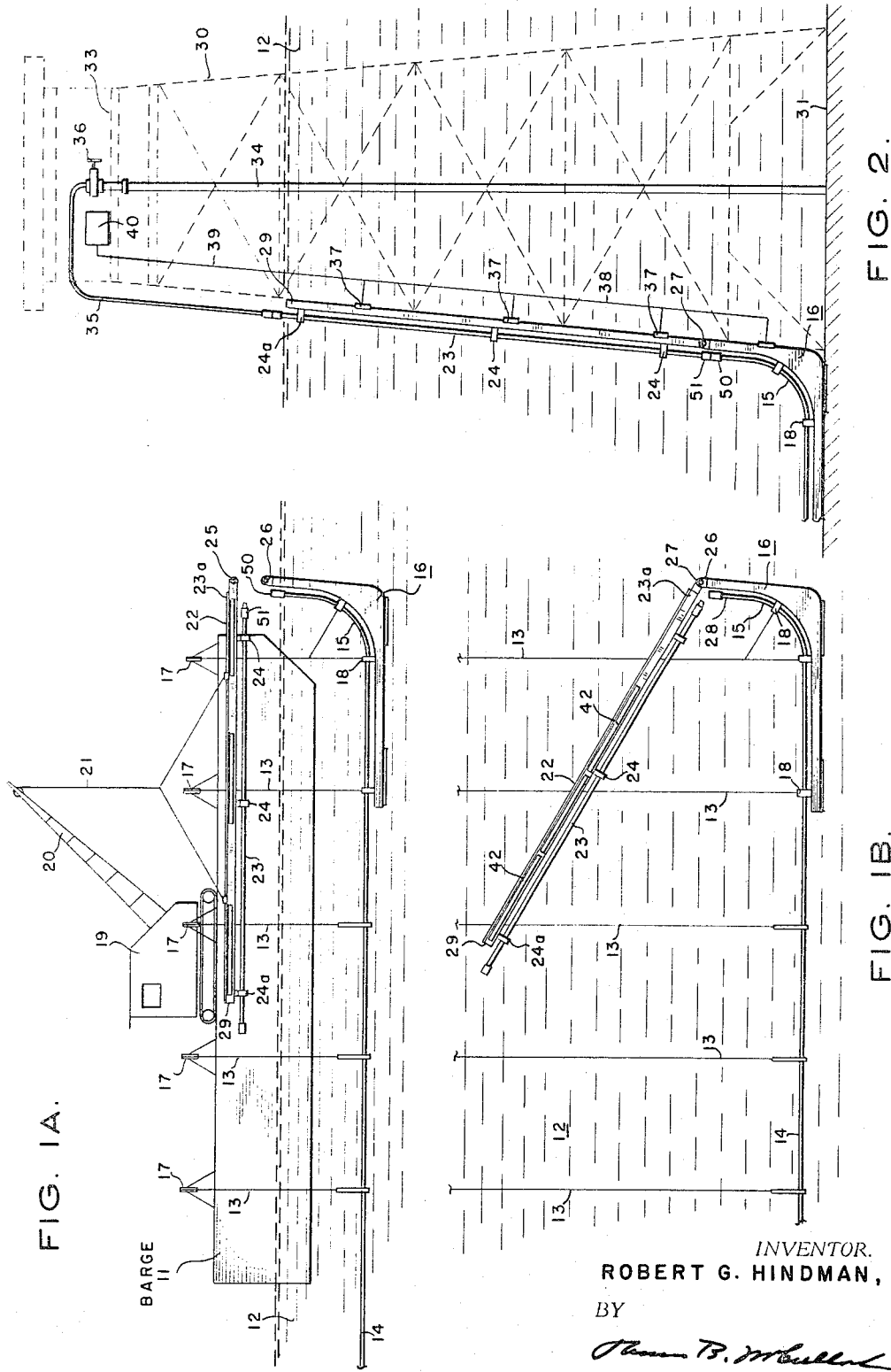

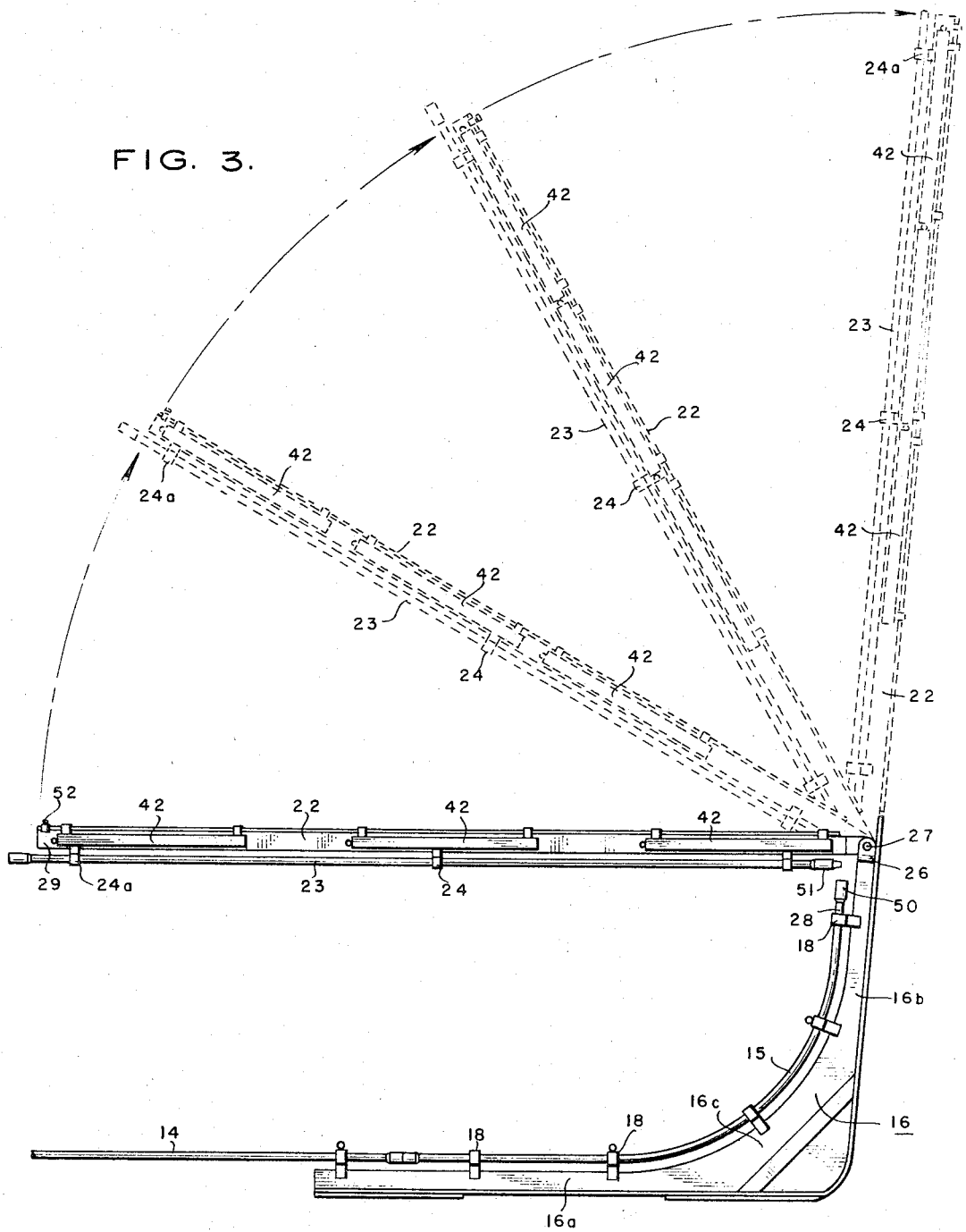

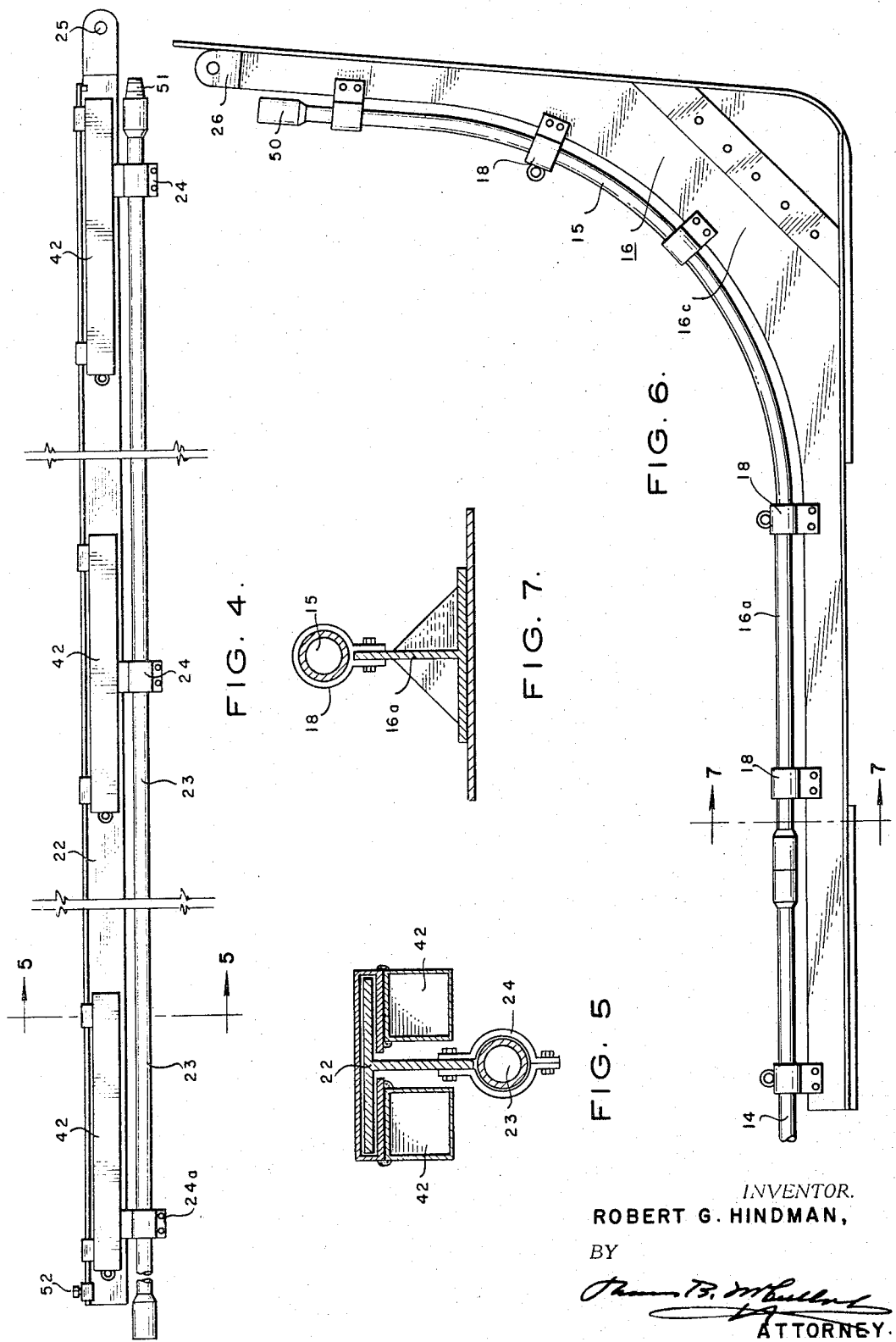

ABSTRACT OF THE DISCLOSURE

A pipeline having a curved or lateral free end has a riser arranged adjacent thereto, normal to the lateral end such that on pivoting to the vertical the riser may be connected to the lateral free end and the assembly connected to an offshore structure.

---

The present invention is directed to method and apparatus for connecting and installing a pipeline riser. More specifically, the invention is concerned with installing and connecting a pipeline riser in deep water. In its more specific aspects, the invention is concerned with installation and connection of a pipeline riser in water depths where the use of divers is impractical and hazardous.

The present invention may be briefly described as apparatus for use in a body of water which comprises a structural frame which may have an L-shape on which a curved pipe is supported. A beam member is hingedly connected at one end to a free end of the frame for rotatable movement of the beam member relative to the frame. A pipe member is supported on the beam member for longitudinal movement relative to the frame, the pipe member having an end adapted to be arranged adjacent a free end of the curved pipe. The apparatus comprises means for connecting the free end of the curved pipe and the end of the pipe member after the beam member is rotated to a substantially vertical position. The apparatus is attached to an upright structure, such as an oil or gas well platform, located in the body of water.

The present invention is also concerned with a method for connecting a pipeline riser wherein a section of pipeline having a curved or lateral free end is arranged in a body of water with the curved or lateral free end of the pipeline extending above water surface. The pipeline is supported in the body of water and a pipeline riser is arranged substantially normal to the curved free end of the pipeline with an end of said pipeline riser adjacent the curved free end. The pipeline and the pipeline riser are then lowered to water bottom and the pipeline riser is rotated to a substantially vertical position such that the end other than the end adjacent the curved free end is accessible from the water surface. The pipeline riser and the frame are then attached to a structure located in the body of water and then the pipeline riser is moved downwardly to engage with the curved free end, following which the pipeline riser and the curved free end are sealingly connected to form a conduit. The upper end of the pipeline riser may then be connected to a well extending from the structure into a submarine formation.

The present invention will be further illustrated by reference to the drawing in which:

FIGS. 1A to 1B illustrate a stepwise operation;

FIG. 2 illustrates the apparatus attached to an offshore platform arranged in a body of water;

FIG. 3 is a detailed view of the apparatus of the present invention illustrating the rotation of the riser to a substantially vertical position;

FIG. 4 is an enlarged detail view of the riser frame connected to the riser pipe;

FIG. 5 is a sectional view taken along the line 5—5 of FIG. 4;

FIG. 6 is an enlarged detail view of the frame member supporting the curved section of the pipeline and to which the riser assembly is to be connected; and FIG. 7 is a sectional view taken along the line 7—7 of FIG. 6.

Referring now to the drawing in which identical numerals designate identical parts, and specifically to FIGS. 1A and 1B, the numeral 11 designates a barge or other work vessel in a body of water 12. Supported from the barge 11 by a plurality of flexible lines 13 is a pipeline run 14 which terminates in a curved pipe 15 supported by an L-shaped frame member 16. The lines 13 in turn are attached to hoist means 17 on the barge 11 and serve to support the pipeline run 14, the curved section 15, and the frame member 16 to which the curved section 15 is attached, by clamp means 18.

On the barge 11 is a hoisting means 19 provided with a boom 20 from which a flexible line 21 extends, to which is connected by the usual clamp means an elongated beam member 22, carrying slidably on its underside a pipeline riser 23. The pipeline riser 23 is arranged in pipe guides 24 for slidable movement on the beam 22. The pipe guide 24a adjacent the free end 29 of frame 22 serves as a pipe clamp to prevent the pipe riser 23 from slipping down on the frame 22 prior to connecting operations. The remainder of the guides serve merely as guide members and do not clamp the pipe. The beam 22 is provided with a transverse passageway 25 to receive a pin member 27 which serves as a hinge when the beam member 22 is attached to the frame member 16. The vertical portion of the frame member 16 is provided with a yoke 26 which receives the end of the beam 22 having the passageway 25. The pin 27 is placed in corresponding passageways in the yoke 26 to allow connection of the beam member 22 to the frame 16, as shown in FIG. 1B. The pipeline riser 23 has an end 23a adjacent the free end 28 of the curved pipe section 15.

In FIG. 1B the frame member 16 and the beam member 22 are shown with the beam 22 being rotated about the pin 27 which serves as a hinge. This rotation may be accomplished by raising the end 29 of the beam 22, such as with the hoisting means 19 or by providing buoyancy to the beam 22 and increasing the buoyancy adjacent the end 29.

In any event, referring now to FIG. 2, the frame 16 with the beam 22 and the riser 23 in a substantially vertical position have been lowered to water bottom 31 and are moved against the structure 30, which is embedded in water bottom 31 and which supports the platform 32 from which drilling and other operations may be conducted. A subplatform 33 is also supported by the structure 30 and serves as a production cellar. A well conduit 34 extends from a submarine formation to the subplatform 33 and is connected by a conduit 35, controlled by wellhead equipment 36, to the riser 23.

When the beam member 22 and the frame member 16 are moved against the structure 30, the beam 22 and its attendant apparatus are clamped to the structure 30 by means of hydraulically operated clamps 37 which receive hydraulic fluid through a manifold 38 by way of line 39 connecting to a source of hydraulic fluid 40 which may include suitable tanks and pumps.

Referring now to FIG. 3, the frame 16 is provided with a horizontal member 16a and a substantially vertical member 16b. Members 16a and 16b form an L-shaped structure with the vertical component forming an angle greater than 90° to coincide with the angle of the structure 30, as shown in FIG. 2. A brace member 16c is connected to the members 16a and 16b to which the clamps 18 are attached which, in turn, connect the curved section 15 to the frame 16.

It will be noted that the curved section 15 is provided with a connecting means 50 on its upper free end.

Also, it will be noted that the pipeline riser 23 is provided with a connecting means 51 on the end 23a adjacent the connecting means 50.

To rotate the beam 22 about the pin 27 to a substantially vertical position, a plurality of floats 42 is arranged on the upper end of the beam 22 with the floats 42 farthest removed from the end 29 being slidably arranged on the beam 22. Thus, movement of the floats 42 towards the end 29 causes the beam 22 to pivot or rotate about the pin 27, as shown in FIG. 3, following the direction of the arrows until the beam 22 and the riser 23 reach a substantially vertical position, as shown in the righthand portion of FIG. 3. The floats 42 may slide toward the end 29 by virtue of their buoyancy or a flexible line may be attached to the floats 42 and force exerted thereon to cause the floats 42 to move outwardly thereon towards the end 29 to cause said rotation.

After the beam 22 has been clamped to the structure 30, as shown in FIG. 2, guide member 24a is loosened on the pipe 23 to allow the pipe to be moved down through the guide members 24 and cause mating engagement of the connecting means 50 and 51. These connecting means may be the usual threaded pin and box ordinarily employed to interconnect pipe conduits employed in oil and gas wells, whereby rotation of the riser 23 will cause a sealing engagement between the riser 23, the pipeline 14 and its curved section 15.

The floats 42 are prevented from sliding off the free end 29 of the frame 22 by means of a removable stop member 52 bolted to the frame 22. Just prior to clamping the frame 22 to the structure 30, the floats 42 may be removed if desired by removing the stop 52 and sliding the floats off the free end 29.

The whole system may be retrieved by reversing the method described with respect to the several figures of the drawing. If only the pipeline riser 23 is to be retrieved, the underwater connection may be broken and the riser retrieved for repair or replacement without altering or disturbing the remainder of the pipeline. It will be understood that the pipeline 14 may be completed prior to the operation described or it may be completed by connections made after the present operation.

The present invention is quite important and useful in that below about 250 ft. water depths divers cannot be practically used in that at these depths they may work for only limited periods of time. The present invention eliminates the need for divers to work at excessive water depths. Also, in very deep water, the mud line may be below diving levels and it is impossible for divers to work where there is a thick layer of mud. The present invention also allows substantially all operations to be conducted from the water surface and thus eliminates hazardous operations by personnel.

The nature and objects of the present invention having been completely described and illustrated and the best mode contemplated set forth, what I wish to claim as new and useful and secure by Letters Patent is:

I claim:
1. Apparatus which comprises a structural frame, a curved pipe supported by said frame, a beam member hingedly connected at one end to a free end of said frame for rotatable movement of said beam member relative to said frame, a pipe member supported on said beam member for longitudinal movement relative to said beam member and supported thereon in a position such that an end of said pipe member is arranged adjacent a free end of said curved pipe in longitudinal alignment therewith when said beam member is in one position relative to the frame, and means for connecting the free end of said curved pipe and the end of said pipe member.

2. Apparatus in accordance with claim 1 in which the frame is an L-shaped structure supporting the curved pipe.

3. Apparatus in accordance with claim 1 in which means are arranged on said beam member to provide said rotatable movement.

4. Apparatus in accordance with claim 3 in which the means to provide said rotatable movement are float means slidably arranged on said beam member.

5. Apparatus in accordance with claim 1 in which said beam member is attached to an upright structure in a body of water.

6. Apparatus in accordance with claim 5 in which said upright structure supports a platform from which a well extends to a submarine earth formation and the other end of said pipe member is connected to said well.

7. Apparatus in accordance with claim 5 in which said upright structure is provided with hydraulically operated attaching means for attaching said beam member to said upright structure.

8. A method for connecting a pipeline riser wherein a section of pipeline having a lateral free end is arranged in a body of water with the lateral free end of said pipeline extending above water surface, which comprises arranging in said body of water a pipeline riser substantially normal to said lateral free end with an end of said riser adjacent said lateral free end, rotating said pipeline riser to a substantially vertical position such that the end other than the end adjacent said lateral free end is accessible from the water surface and the end adjacent the lateral free end is in longitudinal alignment therewith, attaching said riser to a structure located in said body of water and connecting the end of said riser adjacent said lateral free end to said lateral free end.

9. A method in accordance with claim 8 in which said other end is connected to a well extending from said structure.

10. A method in accordance with claim 8 in which said section of pipeline is supported in said body of water and said pipeline and said pipeline riser are then lowered to water bottom prior to rotating said pipeline riser to said vertical position.

11. A method in accordance with claim 10 in which said pipeline riser is buoyantly supported as it is being lowered and said pipeline riser is rotated by increasing the buoyancy of the end other than the end adjacent said lateral free end.

12. A method in accordance with claim 8 in which the pipeline riser is attached to said structure located in said body of water and said pipeline riser is moved downwardly to engage and sealingly connect with said lateral free end and with said section of pipeline.

13. A method in accordance with claim 8 in which said other end of said pipeline riser is connected to a well extending from said structure.

14. A method in accordance with claim 8 in which said pipeline riser is disconnected from said pipeline section and said disconnected pipeline riser is then moved upwardly.

References Cited

UNITED STATES PATENTS

| Re. 23,963 | 3/1955 | Collins | 61—72.4 |
| 1,220,188 | 3/1917 | Chapman | 61—72.4 |
| 1,664,643 | 4/1928 | Rasmussen | 166—92 |
| 3,219,116 | 11/1965 | Matthews | 166—0.5 |
| 3,226,728 | 12/1965 | Walvoord | 166—0.5 |
| 3,258,928 | 7/1966 | Broadway et al. | 166—0.5 X |
| 3,299,957 | 1/1967 | O'Neill et al. | 166—77.5 |
| 3,308,881 | 3/1967 | Chan et al. | 166—0.6 |

CHARLES E. O'CONNELL, *Primary Examiner.*

IAN A. CALVERT, *Assistant Examiner.*